United States Patent [19]

Bernasconi et al.

[11] Patent Number: 5,044,579

[45] Date of Patent: Sep. 3, 1991

[54] INFLATABLE FOLDABLE STRUCTURE AND METHOD OF MANUFACTURING FOLDABLE STRUCTURES

[75] Inventors: Marco C. Bernasconi; Karl Kotacka, both of Zürich, Switzerland

[73] Assignee: Oerlikon-Contraves, AG, Zurich, Switzerland

[21] Appl. No.: 343,299

[22] PCT Filed: Jun. 21, 1988

[86] PCT No.: PCT/CH88/00112

§ 371 Date: Feb. 23, 1989

§ 102(e) Date: Feb. 23, 1989

[87] PCT Pub. No.: WO88/10211

PCT Pub. Date: Dec. 29, 1988

[30] Foreign Application Priority Data

Jun. 24, 1987 [CH] Switzerland ............... 02375/87

[51] Int. Cl.⁵ ............................................. B64G 1/22
[52] U.S. Cl. ............................... 244/158 R; 285/156; 52/2.15; 52/2.18
[58] Field of Search ............... 244/158 R, 49, 159, 244/146; 52/2 E, 2 K; 343/915, 880, 872; 342/8; 285/150, 156

[56] References Cited

U.S. PATENT DOCUMENTS

| | | | |
|---|---|---|---|
| 1,678,537 | 7/1928 | Schonbrun | 244/146 |
| 2,297,150 | 9/1942 | Hunter | |
| 2,955,606 | 10/1960 | Walker | 52/2 K |
| 2,979,064 | 4/1961 | Fischer | 52/2 K |
| 3,092,854 | 6/1963 | Manhart | 52/2 K X |
| 3,217,325 | 11/1965 | Mullin | 342/8 |
| 3,274,596 | 9/1966 | Raabe | 52/2 K X |
| 3,277,479 | 10/1966 | Struble, Jr. | 52/2 K X |
| 3,277,614 | 10/1966 | Marie | 52/2 K |
| 3,282,533 | 11/1966 | Spain | 244/158 A X |
| 3,386,687 | 6/1968 | Rollins | 244/49 |
| 3,405,886 | 10/1968 | Gosnell et al. | 244/158 R |
| 3,477,662 | 11/1969 | Anderson | 244/173 |
| 4,105,173 | 8/1978 | Bucker | 244/146 |
| 4,166,569 | 9/1979 | Seifert et al. | 244/160 |
| 4,295,302 | 10/1981 | Liu | 52/2 K |
| 4,309,851 | 1/1982 | Flagg | |
| 4,583,330 | 4/1986 | Huang | 52/2 E |
| 4,825,599 | 5/1989 | Swann, Jr. | 343/915 X |

FOREIGN PATENT DOCUMENTS

| | | | |
|---|---|---|---|
| 1257593 | 12/1967 | Fed. Rep. of Germany | |
| 666235 | 7/1988 | Switzerland | 244/158 R |
| 8807002 | 9/1988 | World Int. Prop. O. | 244/159 |

OTHER PUBLICATIONS

Marco C. Bernasconi et al., "Inflatable, Space-Rigidized Structures, Overview of Applications and Their Technology Impact", Acta Astronautica, vol. 14, pp. 455–465, 1986.

Primary Examiner—Johnny D. Cherry
Assistant Examiner—James M. Kannofsky
Attorney, Agent, or Firm—Sandler, Greenblum & Bernstein

[57] ABSTRACT

The application of technically sensitive devices in outer space requires adequate protective shields or protective chambers which protect the payload against atmospheric radiation, thermal effects etc.

The foldable structure according to the invention consists of a topological arrangement of flexible tubes which are joined to each other and form the skeleton of the shield or of the chamber. To these tubes there are attached membranes which serve as protective walls.

The method of manufacturing a finished protective device uses such a foldable structure, whereby the structure is unfolded by inflation of the tubes and assumes the desired two-dimensional or three-dimensional form. The membranes are also stretched by the extension of the tubes and the interaction of the membranes and the tubes, such tubes acting as struts in the inflated condition, produces a stable structure.

The foldable structure according to the invention and the method of manufacturing render possible that devices having dimensions of and more meters can be easily erected with high reliability. Since the structure in the unfolded condition is stabilized by the tubes, non-closed surfaces or protective chambers comprising hatches can also be manufactured in contrast to balloon-type bodies known so far.

32 Claims, 5 Drawing Sheets

1

INFLATABLE FOLDABLE STRUCTURE AND METHOD OF MANUFACTURING FOLDABLE STRUCTURES

CROSS-REFERENCE TO RELATED PATENT

This application is related to the commonly assigned U.S. Pat. No. 4,755,819 granted Jul. 5, 1988, entitled "REFLECTOR ANTENNA AND METHOD OF FABRICATION".

BACKGROUND OF THE INVENTION

The present invention relates to new and improved inflatable foldable structures for protective devices or other auxiliary devices, their use as protective shields and protective chambers for shielding pay loads in outer space, and a method of manufacturing foldable structures.

The use of sensitive technical devices in outer space requires protective shields or protective shrouds which protect the corresponding devices against cosmic and electromagnetic radiation, solar action, meteorites etc. Furthermore, auxiliary devices are required in order to maintain defined atmospheric conditions or ambient temperatures for certain pay loads or in order to protect experiments or a specific working area from outer space. Stringent requirements are demanded of such auxiliary devices or protective devices, such requirements depending on the specific operational system of the devices. In addition to a high reliability during unfolding and in operation, there exist requirements such as a low weight and a small storage volume while possessing a sturdy construction, as well as a lowest possible price. Furthermore, it is above all of importance that the device in the operating condition can attain large overall dimensions, typically 10 meters and more.

Known devices of this type cannot be applied for larger constructions because of their complexity, their dimensions or the too high cost and have therefore structure dependent limits. Particularly, mechanical self-opening devices of larger dimensions are thereby not anymore applicable. Conventional protective shields as used in conjunction with cryostats are not unfoldable and possess small dimensions. Furthermore, known balloon-type inflatable chambers permit only very limited operational possibilities on account of their form, since essentially only ball-shaped or lense-like forms are possible. Moreover, such inflatable devices have the major disadvantage that it is hardly possible to provide openings in the surface, which openings would allow to subsequently place further objects within the chambers.

SUMMARY OF THE INVENTION

It is one object of the invention to provide a method of manufacturing protective devices for application in outer space, so that also large pay loads can be partially shielded or entirely enclosed by means of such a device, such devices rendering possible in their geometry substantially any two-dimensional or three-dimensional structures and complying in optimum manner with the requirements as to low weight, small packaging volume, high reliability, rigidity and low price.

It is a further object of the invention to provide a foldable supporting structure or a foldable structure which can be used for such protective devices, exhibits low weight and can be folded into a small packaging volume and again unfolded with very high reliability.

Now in order to implement these and still further objects of the invention, which will become more readily apparent as the description proceeds, the inflatable foldable structure of the present development is manifested, among other things, by the features that, a plurality of inflatable flexible tubes are joined to form a gas-tight skeleton and that membranes are attached between the tubes to this skeleton.

The foldable structure according to the invention is composed of a topological arrangement of flexible inflatable tubes which are joined to each other. At these tubes there are attached membranes which in the unfolded condition form the actual protective walls. Since the tubes as well as the membranes are formed of plastic material, this foldable structure is of relatively low weight. Furthermore, there is the advantage of simple manufacture, any length whatever of the tubes and a small packaging volume.

The method of manufacturing or producing a finished protective device uses such a foldable structure, whereby the structure is unfolded by inflation of the tubes and assumes the desired skeleton-type, for example, three-dimensional form. By means of selective stretching of the tubes, the membranes are also stretched such that the interaction of the membranes and the tubes, such tubes acting as struts in the inflated condition, produce a stable two-dimensional or three-dimensional structure. In this manner, a reliable unfolding in outer space is ensured. By the use of thermoplastics and a chemically curable coating of the tubes or of the membranes, the device can be permanently fixed in the inflated condition without the gas pressure having to be maintained within the tubes.

Brief Description of the Drawings

The method and different exemplary embodiments of the invention will be described in further detail with reference to the following drawings and wherein:

FIG. 2b shows the base surface of the heat shield according to FIG. 2a;

FIG. 3b shows the base surface of the prismatic heat shield as shown in FIG. 3a;

Detailed Description of the Preferred Embodiments

The method according to the invention renders possible the manufacture of two-dimensional or three-dimensional structures which comprise a skeleton-type construction. The form is solely limited by the specified topological requirements of the foldable structures. It is possible to manufacture with adequate stability structures having overall dimensions of 10 or more meters.

Figure 1A:
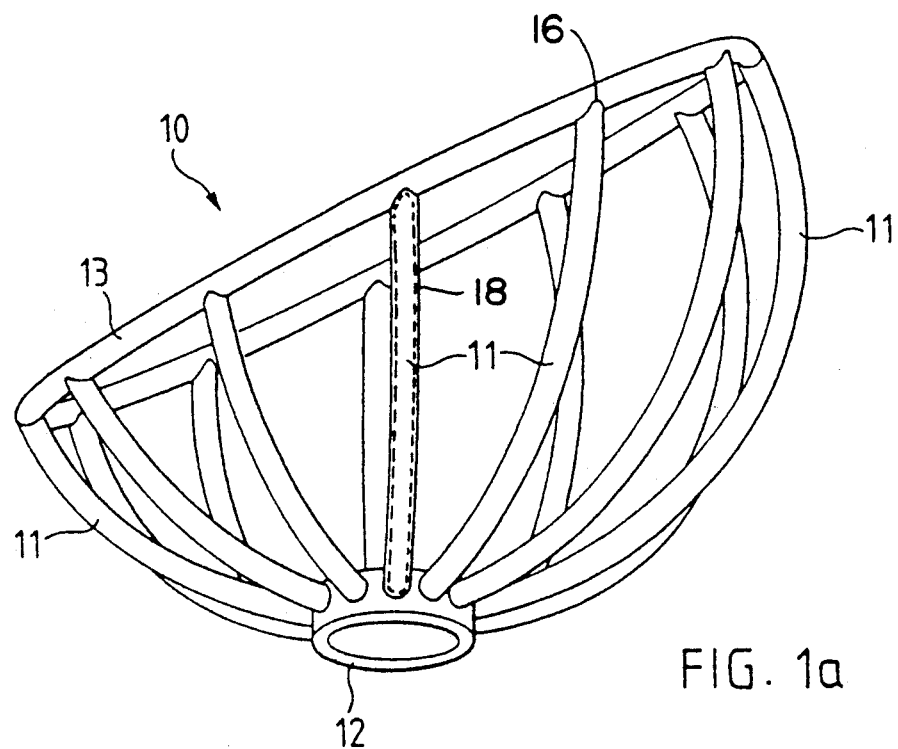
FIG. 1a shows a skeleton for a spherical heat shield according to FIG. 1b.
Figure 1B:
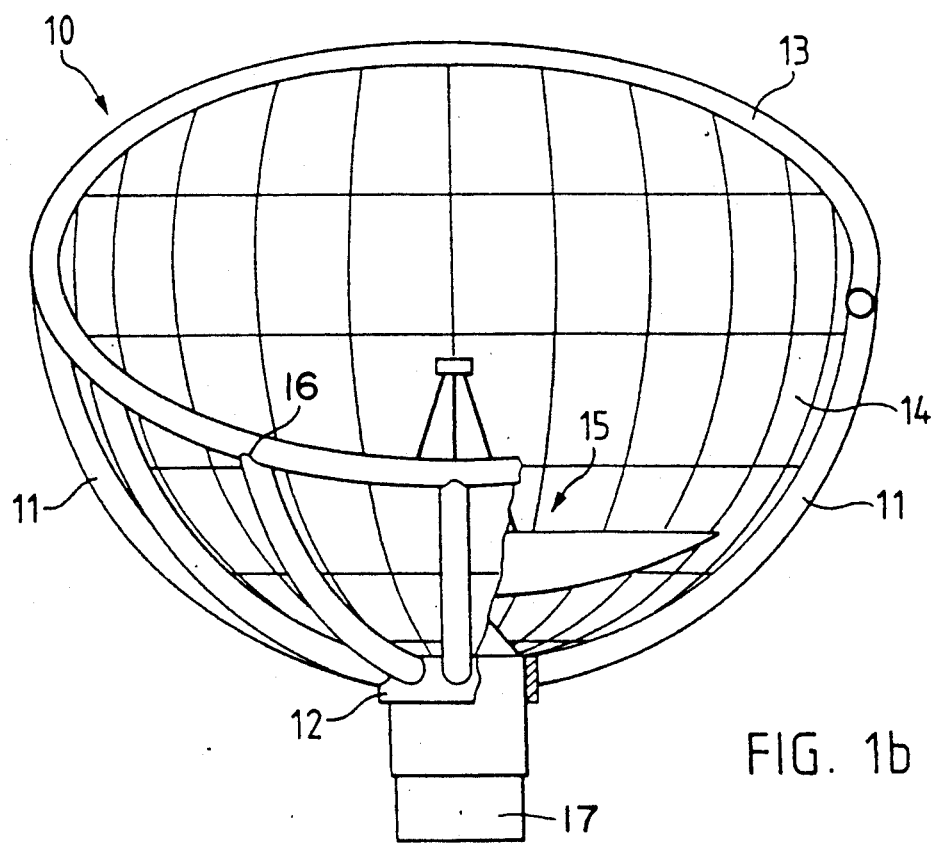
FIG. 1b shows a spherical heat shield having a reflecting plastic foil.
Figure 2A:
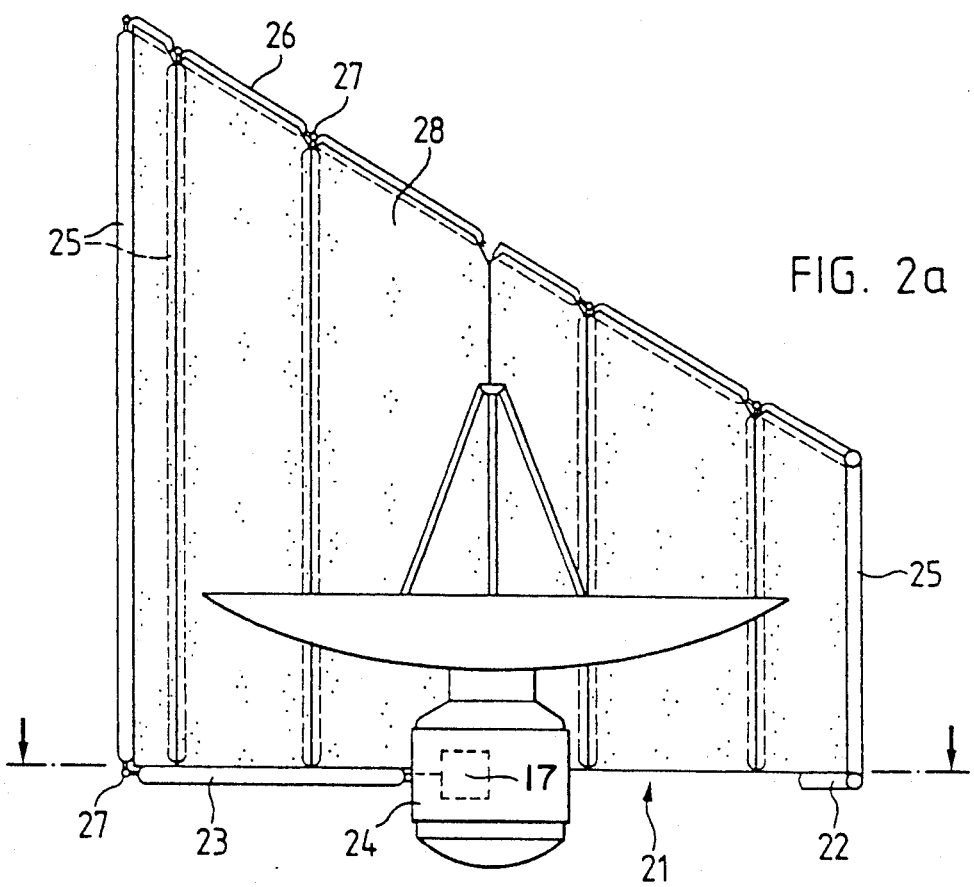
FIG. 2a shows a heat shield having a prismoidal structure.
Figure 2B:
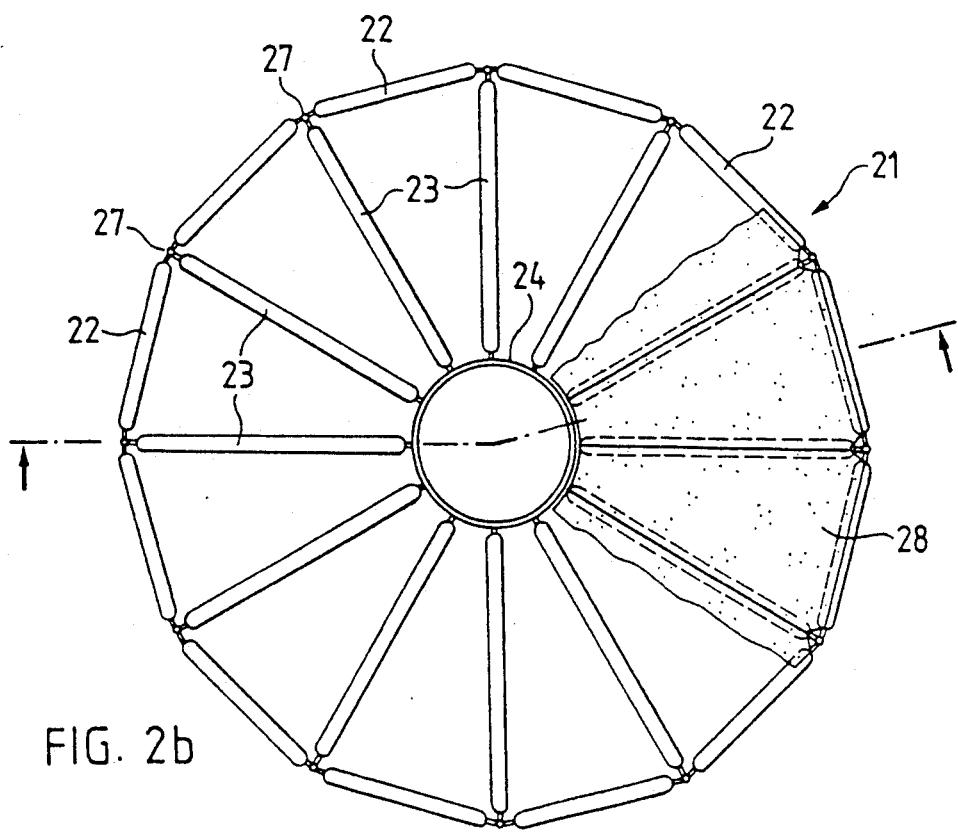
Figure 6:
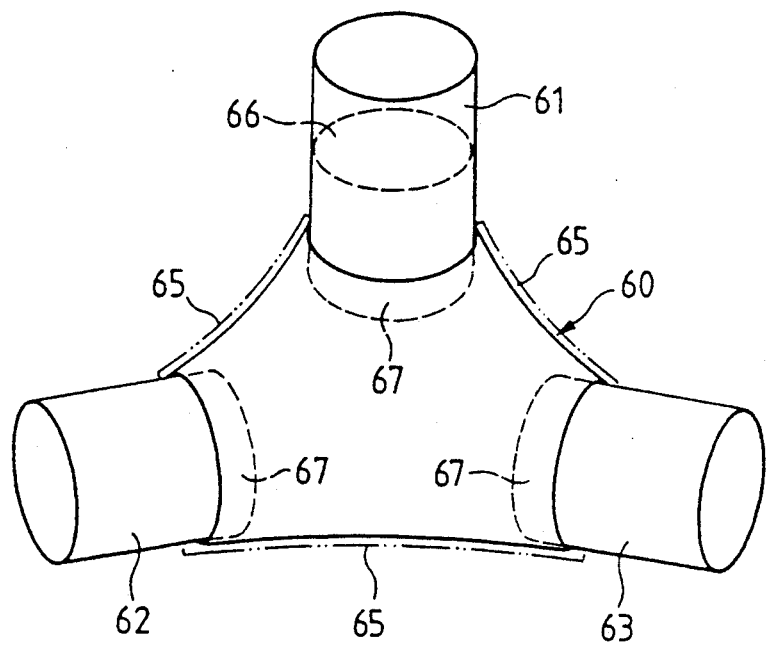
FIG. 6 shows a point of connection between three tube struts.

The skeleton of these structures is composed of individual flexible tubes 11 (FIGS. 1a and 1b) which are joined to each other by means of coupling elements 27 as shown in FIG. 2b or are directly joined to each other at nodal points 16 as shown in FIGS. 1a and 1b. These coupling elements 27 are structured such that an exchange of gas can take place between the interior of the individual tubes 22 and 23 (FIG. 2b). If a closed system is formed in this manner by these tubes 22 and 23, then the entire skeleton can be inflated by a pressure source 17 (FIG. 1b) with any suitable gas, for example, nitrogen. It is possibly desirable, particularly in the case of complicated structures, that not all tubes are simultaneously inflated, but that rather a sequential inflation takes place. For this purpose there can be provided several pressure sources 17 which separately inflate individual areas of the skeleton. On the other hand, a sequential inflation of different areas can also be achieved by valves, which only open at a certain gas pressure, or by diaphragms or other elements influencing the gas flow, for example, constrictions within the tubes. These valves or diaphragms 66 are schematically indicated in FIG. 6 and influence the exchange of gas. Such valves or diaphragms 66, as the case may be, can be provided either within a tube or in a coupling element. Such a sequential inflation renders possible the manufacture of complicated structures which can be unfolded with very high reliability.

Since the inflation of the foldable structure takes place in outer space, minimum pressures in the range of a few millibars are sufficient to effect inflation. Co-transported pressure tanks or gases generated from solid matter by means of chemical reactions are conceivable as pressure sources 17. It is also possible that the foldable structures can also be unfolded by pouring in liquids which simultaneously can also effect the function of curing the tubes, provided that the total volume of the tubes is not too large.

Since the tubes 11 have to be flexible and should possess a high rigidity in the unfolded condition, fiber reinforced composite material, for example, is used for the outer walls of the tubes. It is of advantage to use for the tubes a material having a smallest possible bending rigidity, so that the tubes can also be folded along the lengthwise axes thereof and in this manner folded as flat as possible. The outer walls of the tubes can thus be manufactured such that the tube is curved in the inflated condition.

Membranes can be fastened between the individual tubes 11. In the inflated condition, such membranes form the actual protective walls 14 (FIG. 1b) of the protective shield 10.

These membranes are really stretched within the structure predetermined by the geometry of the inflated skeleton.

It is also possible to achieve a certain slight curvature of a tube in the inflated condition by the specific form of the membranes. If, for example, a (straight) tube is attached along a membrane edge which possesses a curvature, then the tube subsequent to inflation will extend along this edge with the same curvature. In this manner, the structure can be determined in its geometry by the interaction of tubes and membranes.

The dimensions of such protective devices typically lie within the range of 10 to 15 meters. In this dimensional range, tubes having diameters of approximately 20 to 50 centimeters are used. Naturally, for special applications, elements with larger or smaller dimensions can also be applied. The wall thickness depends on the desired internal pressure and lies in the range of approximately 1 millimeter.

It is obvious that also rigid elements, for example, fastening devices or hatches, can be integrated into the structure, provided that this is not rendered impossible by a predetermined packaging volume.

Particularly, the foldable structures can also be used as carriers of technical and scientific sensors and devices, or as sail surfaces, whereby in such cases essentially two-dimensional arrangements are applied.

The structure once inflated at the location of operation should remain fixed in its form and should not be folded anymore. Such a fixing is preferably achieved in that the inner sides of the tubes are coated with a laminate 18 as indicated, for example, at one of the tubes 11 in FIG. 1a and which laminate 18 only sets when in contact with a catalyzing gas. This gas can be added during inflation or after the structure having already assumed the final shape. There is thus no necessity of maintaining over a longer period the gas pressure within the tubes. It is also possible to fix the structure subsequent to inflation, for instance, by means of a setting filling material which is fed into the cavities of the tubes.

A further possibility of setting is that the membranes and/or the tubes undergo a chemical or physical curing by solar or thermal action or by adding a setting agent, such that the structure remains stable. Insofar as only the membranes are cured, the tubes have a supporting action only during inflation and subsequently only serve to join the individual membranes now rigidized to plates. A combination of fixing the tubes and curing the membranes is also possible.

A spherical heat shield is illustrated in FIGS. 1a and 1b. A plurality of ribs 11 project from a solid base ring 12 (FIG. 1a). All these ribs 11 come together in a ring 13. The ring 13 as well as these ribs 11 are composed of flexible tubes and gas-tightly connected to each other, whereby the ribs 11 are directly adhesively bonded or welded with the ring 13 at nodal points 16. The tubes 11 are fabricated such that they comprise a curvature in the inflated condition and the skeleton thus assumes a spherical shape. The skeleton is inflated via a central pressure source 17 as indicated in FIG. 1b of the drawings. At the ribs 11 there is attached a plastic foil 14 which is stretched, after inflation of the skeleton (FIG. 1b). This foil 14 comprises, for instance, a reflecting coating and protects the pay load 15 against a detrimental heat radiation. A multi-layer or multi-phase flexible cloth or foil (for example MLI) can be used as the foil 14.

The thermo-protective shield can be fastened by means of the solid base ring 12 to a carrier element, a spaceship or even to the pay load itself. The pressure source 17 and if need be the activating medium or filling material for the fixation of the tubes are provided in the pay load or the spacevehicle and connected via connecting lines with the skeleton (not shown in FIG. 1). In outer space the folded structure is unfolded according to the described method and fixed.

FIGS. 2a and 2b show a prismoidal foldable structure in the inflated condition. The base surface 21 is formed by tube struts 22 which form the edges of a regular dodecagon (FIG. 2b) In radial direction there are mounted further struts 23 for reinforcing purposes. These struts 23 converge in a fastening ring 24. The actual protective jacket 28 is tentered by lengthwise struts 25, whereby such a strut 25 projects from each corner point of the base surface. The other ends of these lengthwise struts 25 are, in turn, coupled via struts 26, whereby these struts 26 lie in a plane inclined with respect to the lengthwise axis. All these struts 22, 23, 25 and 26 consist of flexible inflatable tubes. The protective jacket 28 can be made up of individual sections or, in the case of smaller structures, can also be composed of one piece, which are attached to the lengthwise struts 25 and, if necessary, to the ring struts 22 and 23.

In order to be able to inflate the skeleton by means of one central pressure source 17, the coupling elements 27 between the individual struts are formed by tube connections. Such tube connections can also consist of a flexible material, but can also be rigid in order to define, for example, the angle between the lengthwise struts 25 and the base surface 21. Therefore, in the illustrated protective shield, preference is given to rigid coupling elements 27, provided that no additional struts or fixed elements are provided in order to achieve the right angle between the lengthwise struts 25 and the base surface 21.

Figure 3A:
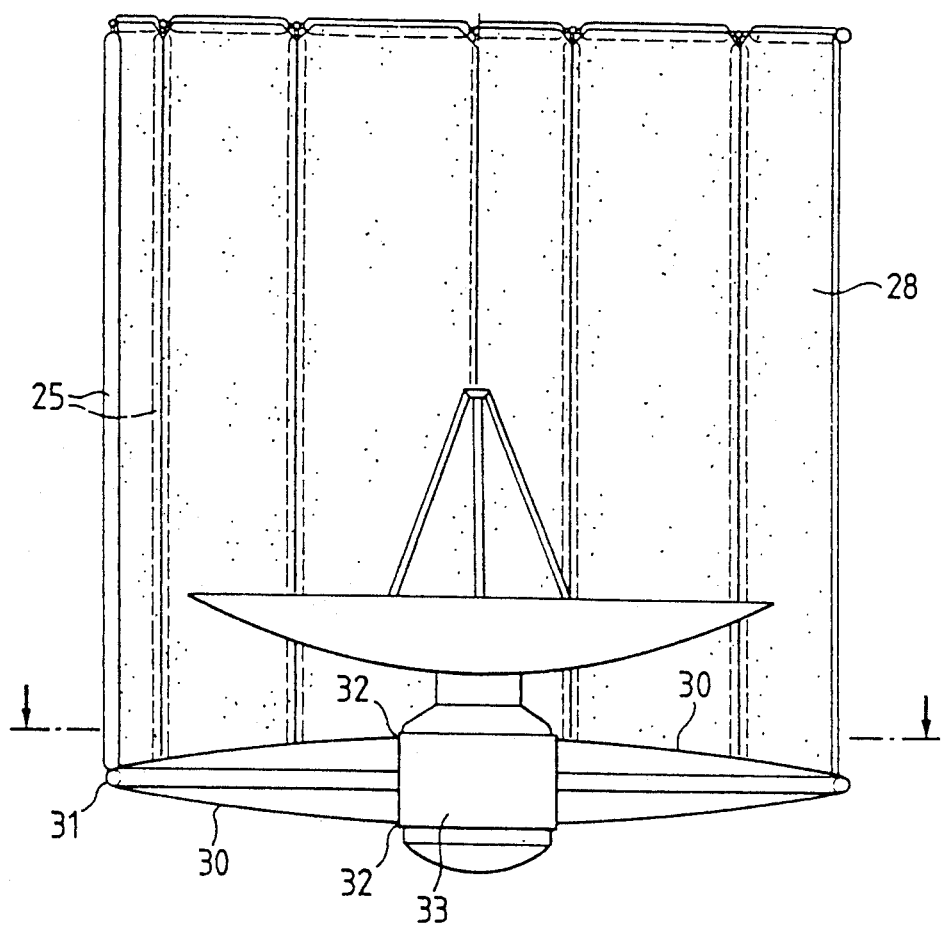
FIG. 3a shows a prismatic heat shield.
Figure 3B:
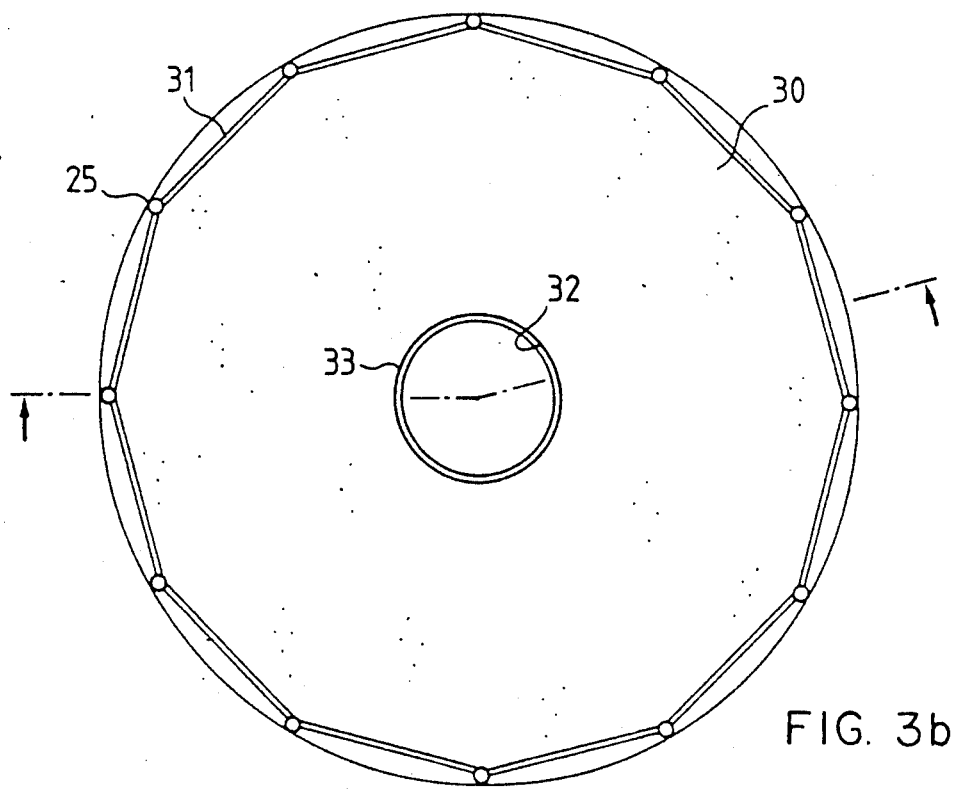

FIGS. 3a and 3b show a shield very similar to the heat shield just described above. However, in this shield the form of the base surface is obtained by two correspondingly structured membranes 30, at the outer edges of which there are attached struts 31 forming a closed ring. These two membranes 30 are stretched by inflation of the chamber between the membranes 30, thus also producing a twelve-angled base surface. In the recesses 32 of the membranes 30 there is provided a fastening ring 33. An additional stretching force can be achieved by inflation and fixing of the struts 31. Moreover, in order to raise the stability of the base surface, the inner surfaces of the membranes can be coated, for example, with a curing laminate.

Figure 4:
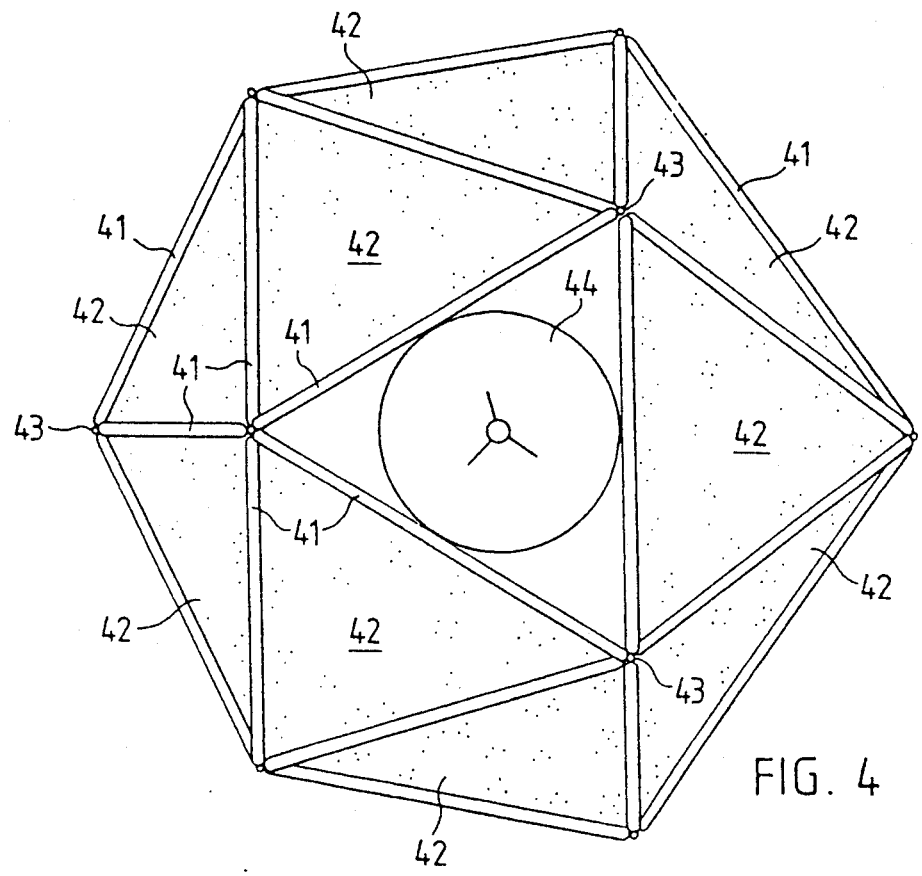
FIG. 4 shows a chamber in the form of a icosahedron.

A further exemplary embodiment of the invention is illustrated in FIG. 4. A shield in the form of an icosahedron encloses a chamber in which defined physical conditions can be maintained, since this chamber can be shielded from outer space. The inflated and fixed struts 41 firmly hold the structure in this form without an overpressure having to prevail within this body. Triangular plastic membranes 42 are stretched between the struts 41. Since the entire structure is stable independent of the inner pressure in the body, there is also the possibility of providing hatches which can be opened and closed for bringing, for example, experimental devices into the interior of the body. Five struts 41 project from each corner point of the icosahedron and are joined to each other by means of coupling elements 43 in order to render possible the inflation by means of a central pressure source. A fastening device 44 in substitution of a plastic membrane can be provided at a side surface in order to render possible the attachment to a spacecraft.

Figure 5:
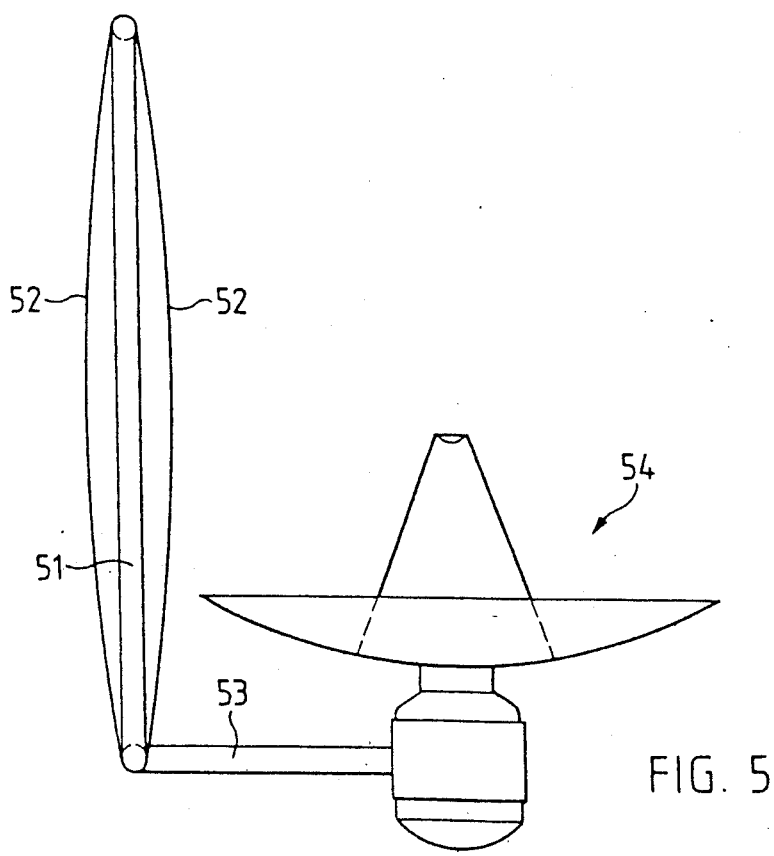
FIG. 5 shows an annular shading shield having two membranes.

FIG. 5 shows a shading shield having a simple, essentially two-dimensional structure. The shield possesses a circular form. An annular tube 51 extends along the periphery of two membranes 52. It is obvious that only one individual membrane could be stretched out instead of the two membranes 52. The shield is connected to the spacecraft via a rigid arm 53 and protects the pay load 54 against solar radiation.

In FIG. 6 there is shown an exemplary embodiment of a coupling member 60. In the illustrated example, three tube-shaped struts 61, 62 and 63, which are open at their ends, are joined to each other. These struts are adhesively bonded or welded at their open end faces 67 to the coupling member 60. In order to raise the stability of these transfer locations, reinforcing rings or other reinforcing elements 65 can be arranged at the outer side. In the event that, for example, the strut 61 is to be inflated only after the two other struts, then it is possible to provide a diaphragm or a corresponding valve 66 in this strut or in the coupling member 60. When gas from a pressure source is now infed via the strut 62, this strut 62 and the strut 63 are first inflated. An inflation of the strut 61 also takes place but only after reaching a certain gas pressure definable by the diaphragm or the valve 66.

In the case of complex foldable structures, controlled valves can also be used to raise the reliability of a correct unfolding in outer space, such that the chronological sequence of the inflation of different parts of the foldable structure can be accurately determined.

Figure 7:
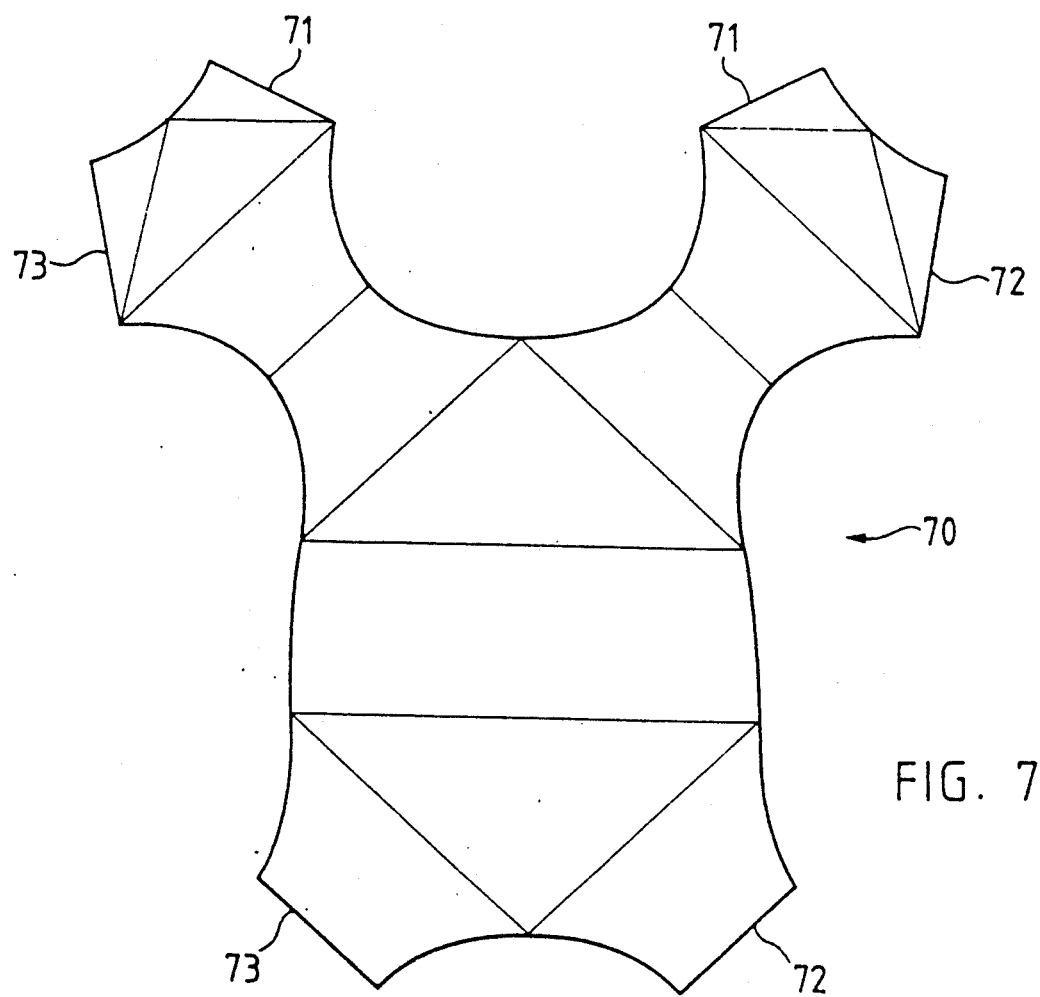
FIG. 7 shows a cut-away pattern for a point of connection at which four tube struts meet.

FIG. 7 shows an example of a cut-away pattern for manufacturing a transfer piece or coupling member for joining four pipe struts. Since the nodal points between the tubes are subjected to a relatively large load, high requirements are imposed upon their fabrication. Therefore, it has proven advantageous to provide as little as possible bonding or welding locations at the nodal points. The manufacture of the transfer piece from one piece of flexible material, for example, fiber reinforced composite material, is effected according to topological aspects in that the developed projection of the three-dimensional transfer piece is defined. The respective corresponding straight edges (71, 72 and 73) of the illustrated cut-away pattern (70) are joined to each other, such that a three-dimensional transfer piece with four circular openings results, at which openings a tube each adjoins.

Furthermore, it is conceivable that the tubes as well as the transfer pieces of the skeleton are fabricated from one piece in order to avoid unnecessary adhesive bonding or welding locations.

Although the invention has so far been described substantially in conjunction with protective devices, the foldable structure can be used particularly as a carrier of technical and scientific sensors and devices or as a sail surface.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. An inflatable foldable structure, comprising:
   a plurality of inflatable flexible tubes;
   a plurality of nodal points defining gas-tight interconnections between predetermined ones of said inflatable flexible tubes of said plurality of inflatable flexible tubes and permitting inflation of said plurality of inflatable flexible tubes and unfolding of the foldable structure to form a skeleton, said plurality of inflatable flexible tubes forming, upon inflation and unfolding of the foldable structure, as said skeleton, a self-supporting structural skeleton;
   a plurality of membranes affixed to respective ones of said plurality of inflatable tubes and extending between respective ones of said plurality of inflatable flexible tubes; and
   a predetermined number of coupling members for providing interconnection between at least some of said plurality of inflatable flexible tubes, said predeterminate number of coupling members permitting gas exchange between said at least some of said plurality of inflatable flexible tubes through said coupling members, wherein:

each one of said coupling members is located at a respective one of said plurality of nodal points;

each one of said coupling members constitutes a three-dimensional coupling member constituting a connecting member for providing said interconnection between a predeterminate number of said plurality of inflatable flexible tubes; and each one of said coupling members is formed in accordance with a predetermined topology of said skeleton from a single coherent piece of flexible, gas-impervious material in the form of a cut-away pattern representing a two-dimensional development of said three-dimensional coupling member.

2. The inflatable foldable structure as defined in claim 1, further including:

a plurality of valves;

each one of said plurality of valves being disposed in a respective one of said plurality of inflatable flexible tubes;

each one of said plurality of inflatable flexible tubes defining an interior space;

the interior spaces of said plurality of inflatable flexible tubes defining an interior of said skeleton upon inflation; and said plurality of valves serving to affect gas exchange within said interior of said skeleton upon inflation of the inflatable flexible tubes and unfolding of the foldable structure.

3. The inflatable foldable structure as defined in claim 1, further including:

a plurality of thin diaphragms;

each one of said plurality of thin diaphragms being disposed in a respective one of said plurality of inflatable flexible tubes;

each one of said plurality of inflatable flexible tubes defining an interior space;

the interior spaces of said plurality of inflatable flexible tubes defining an interior of said skeleton; and said plurality of thin diaphragms serving to affect gas exchange within said interior of said skeleton upon inflation of said plurality of inflatable flexible tubes and unfolding of the foldable structure.

4. The inflatable foldable structure as defined in claim 1, further including:

a plurality of valves;

each one of said plurality of valves being disposed in a respective one of said predeterminate number of coupling members;

each one of said plurality of inflatable flexible tubes defining an interior space;

the interior spaces of said plurality of inflatable flexible tubes defining an interior of said skeleton; and said plurality of valves serving to affect gas exchange within said interior of said skeleton upon inflation of said plurality of inflatable flexible tubes and unfolding of said foldable structure.

5. The inflatable foldable structure as defined in claim 1, further including:

a plurality of thin diaphragms;

each one of said plurality of thin diaphragms being disposed in a respective one of said predeterminate number of coupling members;

each one of said plurality of inflatable flexible tubes defining an interior space;

the interior spaces of said plurality of inflatable flexible tubes defining an interior of said skeleton; and said plurality of thin diaphragms serving to affect gas exchange within said interior of said skeleton upon inflation of said plurality of inflatable flexible tubes and unfolding of said foldable structure.

6. The inflatable and foldable structure as defined in claim 1, wherein:

each one of said plurality of inflatable flexible tubes is made of a fiber reinforced composite material.

7. The inflatable foldable structure as defined in claim 1, wherein:

a predeterminate number of said plurality of inflatable flexible tubes assume a curved shape upon inflation and unfolding of the foldable structure.

8. A method of using an inflatable folded structure in conjunction with placing a payload in outer space, said inflatable folded structure containing a plurality of inflatable flexible tubes, a plurality of nodal points defining gas-tight interconnections between predetermined ones of said inflatable flexible tubes of said plurality of inflatable flexible tubes, and a plurality of membranes affixed to respective ones of said plurality of inflatable flexible tubes and extending between said respective ones of said plurality of inflatable flexible tubes, comprising the step of:

inflating said plurality of inflatable flexible tubes and thereby unfolding the inflatable folded structure to form a protective element for the payload in outer space.

9. The method as defined in claim 8, wherein:

said step of forming said protective element entails forming a protective shield for said payload.

10. The method as defined in claim 8, wherein:

said step of forming said protective element entails forming a protective chamber for said payload.

11. A method of using an inflatable folded structure in conjunction with placing a payload in outer space, said inflatable folded structure containing a plurality of inflatable flexible tubes, a plurality of nodal points defining gas-tight, interconnections between predetermined ones of said inflatable flexible tubes of said plurality of inflatable flexible tubes, and a plurality of membranes affixed to respective ones of said plurality of inflatable flexible tubes and extending between said respective ones of said plurality of inflatable flexible tubes, comprising the step of:

inflating said plurality of inflatable flexible tubes and thereby unfolding the inflatable folded structure to form a carrier for the payload in outer space.

12. A method of using an inflatable folded structure in conjunction with placing a payload in outer space, said inflatable folded structure containing a plurality of inflatable flexible tubes, a plurality of nodal points defining gas-tight interconnections between predetermined ones of said inflatable flexible tubes of said plurality of inflatable flexible tubes, and a plurality of membranes affixed to respective ones of said plurality of inflatable flexible tubes and extending between said respective ones of said plurality of inflatable flexible tubes, comprising the step of:

inflating said plurality of inflatable flexible tubes and thereby unfolding the inflatable folded structure to form a sail surface for the payload in outer space.

13. A method of producing a skeleton of a predetermined topology, comprising the steps of:

prefabricating an inflatable folded structure containing a plurality of inflatable flexible tubes, a plurality of nodal points defining a plurality of gas-tight interconnections between predetermined ones of said inflatable flexible tubes of said plurality of inflatable flexible tubes, and a plurality of membranes affixed to respective ones of said plurality of inflatable flexible tubes and extending between said respective ones of said plurality of inflatable flexible tubes;

during said step of prefabricating said inflatable folded structure, prefabricating, as said inflatable folded structure, an inflatable folded structure which is structured in correspondence with the predetermined topology of the skeleton;

inflating said inflatable folded structure by using a pressure source of gas and thereby unfolding said inflatable folded structure in order to form said skeleton of said predetermined topology;

said step of inflating and unfolding said inflatable folded structure entailing the step of inflating and unfolding said inflatable folded structure in a sequence of inflating and unfolding steps;

thereafter, stabilizing said skeleton of said predetermined topology by said gas from said pressure source of gas and thereby positionally fixing the inflated flexible tubes; and arranging pressure control means in said plurality of inflatable flexible tubes for controlling said step of inflating and unfolding said inflatable folded structure in said sequence of inflating and unfolding steps.

14. The method as defined in claim 13, wherein:
said step of arranging pressure control means in said plurality of inflatable flexible tubes entails arranging, as said pressure control means, a plurality of valves in said plurality of inflatable flexible tubes.

15. The method as defined in claim 13, wherein:
said step of arranging pressure control means in said plurality of inflatable flexible tubes entails arranging, as said pressure control means, a plurality of thin diaphragms in said plurality of inflatable flexible tubes.

16. The method as defined in claim 13, wherein:
said step of prefabricating said inflatable folded structure entails prefabricating an inflatable folded structure further containing a predeterminate number of coupling members interconnecting at least some of said plurality of inflatable flexible tubes; and
arranging pressure control means in each one of said predeterminate number of coupling members for controlling said step of inflating and unfolding said inflatable folded structure in said sequence of inflating and unfolding steps.

17. The method as defined in claim 16, wherein:
said step of arranging pressure control means in said predetermined number of coupling members entails arranging, as said pressure control means, a predeterminate number of valves in said predeterminate number of coupling members.

18. The method as defined in claim 16, wherein:
said step of arranging pressure control means in said predeterminate number of coupling members entails arranging, as said pressure control means, a predeterminate number of thin diaphragms in said predeterminate number of coupling members.

19. The method as defined in claim 13, wherein:
said step of prefabricating said inflatable folded structure entails affixing said plurality of membranes to predetermined mounting locations at said plurality of inflatable flexible tubes; and
said step of inflating and unfolding said inflatable folded structure in order to form said skeleton of said predetermined topology entailing the step of aligning said plurality of inflatable flexible tubes and said plurality of membranes along said predetermined mounting locations.

20. The method as defined in claim 19, wherein:
said step of aligning said plurality of inflatable flexible tubes and said plurality of membranes along said mounting locations entails bending said plurality of inflatable flexible tubes along said predetermined mounting locations.

21. A method of producing a skeleton of a predetermined topology, comprising the steps of:
prefabricating an inflatable folded structure containing a plurality of curable inflatable flexible tubes, a plurality of nodal points defining a plurality of gas-tight interconnections between predetermined ones of said curable inflatable flexible tubes of said plurality of curable inflatable flexible tubes, and a plurality of membranes affixed to respective ones of said plurality of curable inflatable flexible tubes and extending between said respective ones of said plurality of curable inflatable flexible tubes;

during said step of prefabricating said inflatable folded structure, prefabricating, as said inflatable folded structure, an inflatable folded structure which is structured in correspondence with the predetermined topology of the skeleton;

inflating said inflatable folded structure by using a pressure source of gas and thereby unfolding said inflatable folded structure in order to form said skeleton of said predetermined topology;

said step of inflating and unfolding said inflatable folded structure entailing the step of inflating and unfolding said inflatable folded structure in a sequence of inflating and unfolding steps;

thereafter, stabilizing said skeleton of said predetermined topology by curing and thereby positionally fixing the curable inflated flexible tubes; and arranging pressure control means in said plurality of curable inflatable flexible tubes for controlling said step of inflating and unfolding said inflatable folded structure in said sequence of inflating and unfolding steps.

22. The method as defined in claim 21, wherein:
said step of arranging pressure control means in said plurality of curable inflatable flexible tubes entails arranging, as said pressure control means, a plurality of valves in said plurality of curable inflatable flexible tubes entails arranging, as said pressure control means, a plurality of valves in said plurality of curable inflatable flexible tubes.

23. The method as defined in claim 21, wherein:
said step of arranging pressure control means in said plurality of curable inflatable flexible tubes entails arranging, as said pressure control means, a plurality of thin diaphragms in said plurality of curable inflatable flexible tubes.

24. The method as defined in claim 21, wherein:
said step of prefabricating said inflatable folded structure entails prefabricating an inflatable folded structure further containing a predeterminate number of coupling members interconnecting at least some of said plurality of curable inflatable flexible tubes; and arranging pressure control means in each one of said predeterminate number of coupling members for controlling said step of inflating and unfolding said inflatable folded structure in said sequence of inflating and unfolding steps.

25. The method as defined in claim 24, wherein:
said step of arranging pressure control means in said predetermined number of coupling members entails arranging, as said pressure control means, a predeterminate number of valves in said predeterminate number of coupling members.

26. The method as defined in claim 24, wherein:
said step of arranging pressure control means in said predetermine number of coupling members entails arranging, as said pressure control means, a predeterminate number of thin diaphragms in said predeterminate number of coupling members.

27. The method as defined in claim 21, further including the steps of:
coating an interior surface of said inflatable flexible tubes with a curable laminate;
adding a chemical curing agent to said gas of said pressure source; and
said step of stabilizing said skeleton of aid predetermined topology by curing and thereby positionally fixing said inflated flexible tubes entailing the step of chemically curing said laminate coating said interior surface of said inflatable flexible tubes under the action of said chemical curing agent added to said gas and thereby rigidifying said skeleton of said predetermined topology.

28. The method as defined in claim 21, further including the steps of:
coating an interior surface of said inflatable flexible tubes with a curable laminate;
using, as said gas of said pressure source, a gas constituting a catalyst for curing said curable laminate; and
said step of stabilizing said skeleton of said predetermined topology by curing and thereby positionally fixing said inflated flexible tubes entailing the steps of catalytically curing said laminate coating said interior surface of said inflatable flexible tubes under the action of said gas constituting said curing catalyst and thereby rigidifying said skeleton having said predetermined topology.

29. The method as defined in claim 21, further including the steps of:
coating an interior surface of said inflatable flexible tubes with a thermally curable laminate; and
said step of stabilizing said skeleton of said predetermined topology by curing and thereby positionally fixing said inflated flexible tubes entailing the steps of thermally curing said laminate coating said interior surface of said inflatable flexible tubes by exposing said inflatable flexible tubes and said laminate to thermal radiation.

30. The method as defined in claim 21, wherein:
said step of prefabricating said inflatable folded structure entails affixing said plurality of membranes to predetermined mounting locations at said plurality of inflatable flexible tubes; and
said step of inflating and unfolding said inflatable folded structure in order to form said skeleton of said predetermined topology entailing the step of aligning said plurality of inflatable flexible tubes and said plurality of membranes along said predetermined mounting locations.

31. The method as defined in claim 30, wherein:
said step of aligning said plurality of inflatable flexible tubes and said plurality of membranes along said mounting locations entails bending said plurality of curable inflatable flexible tubes along said predetermined mounting locations.

32. The method as defined in claim 21, wherein:
said step of prefabricating said inflatable folded structure entails prefabricating an inflatable folded structure further containing, as said membranes, curable membranes; and
said step of stabilizing said skeleton of said predetermined topology by curing entails the further step of curing and thereby positionally fixing the curable membranes.

* * * * *